March 1, 1949. P. P. RUPPE 2,463,431
BEVERAGE BREWER
Filed Aug. 13, 1945 2 Sheets-Sheet 1
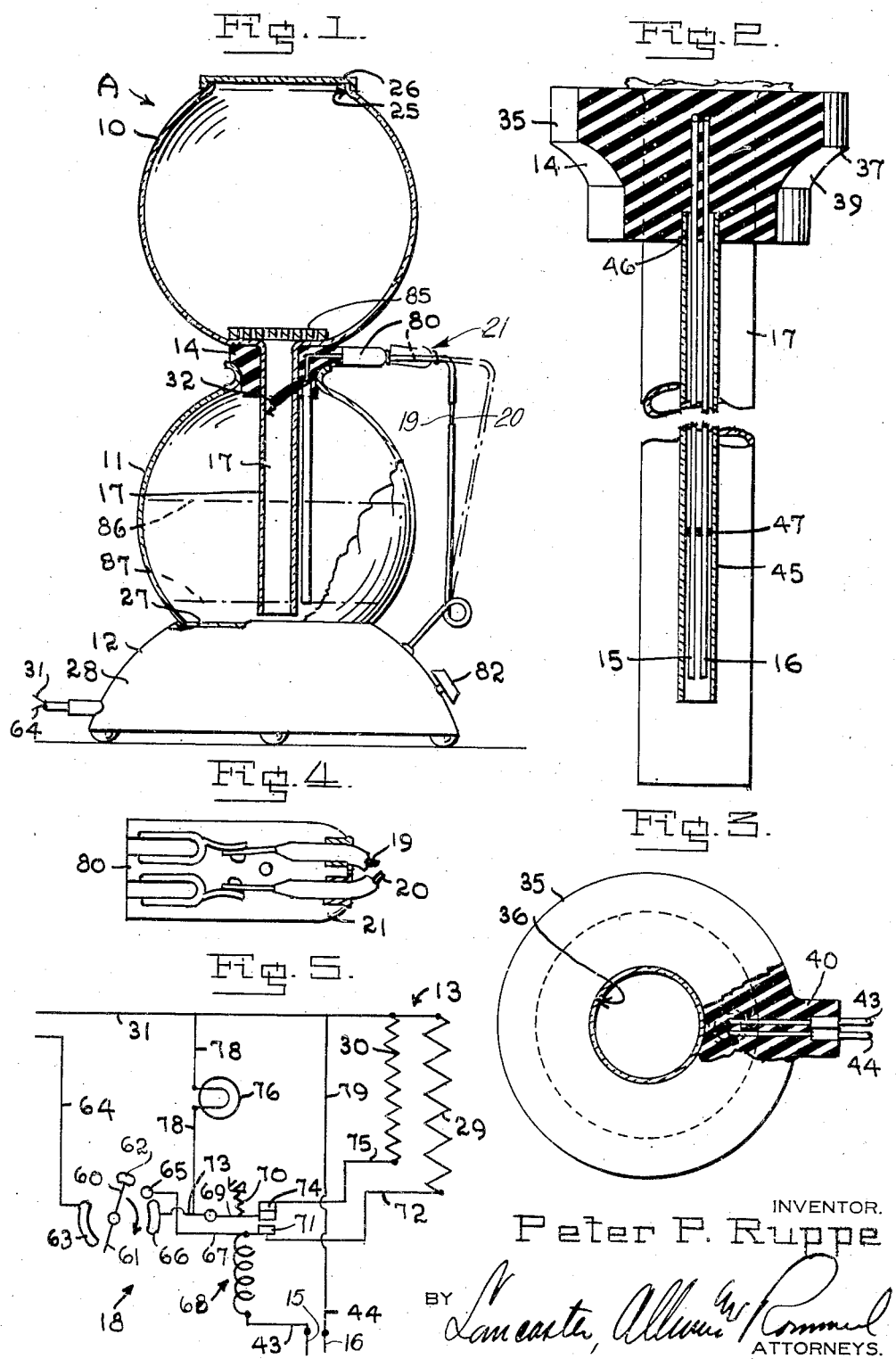

March 1, 1949.  P. P. RUPPE  2,463,431
BEVERAGE BREWER

Filed Aug. 13, 1945  2 Sheets-Sheet 2

INVENTOR.
Peter P. Ruppe
BY Lancaster Allwine Rommel
ATTORNEYS.

Patented Mar. 1, 1949

2,463,431

UNITED STATES PATENT OFFICE 2,463,431

BEVERAGE BREWER

Peter P. Ruppe, Detroit, Mich.

Application August 13, 1945, Serial No. 610,466

5 Claims. (Cl. 99—281)

This invention relates to electric heating devices and particularly to such devices which include a vessel and a stand. An example of such a device is an electric coffee brewer.

An important object of this invention is to provide means for automatically controlling the brewing time of beverages, without the use of thermostats, floats, complicated electric wiring and radical changes in the structure of conventional vessel-and-stand brewing devices.

Another important object is to provide such a means which is not bulky nor apt to get out of order.

Still another important object is to provide a device of this kind wherein the operator in disassembling the device, for cleaning and the like cannot receive an electric shock, since it is necessary to break the electric circuit before the major portions of the device may be disassembled.

A major object is to provide an electrically operated, vacuum-type beverage brewer, wherein but one manual actuation of a switch sets in operation the various heating steps of brewing from start to finish.

Other objects and advantages will be apparent during the following detailed description of the invention, taken in connection with the accompanying drawings, and in which drawings:

Figure 1 is a view mostly in vertical section of the preferred form of the novel brewer.

Figure 2 is an enlarged vertical section of a gasket and electrode assembly carried thereby.

Figure 3 is a top plan of the gasket with portions broken away to better illustrate parts of the construction.

Figure 4 is an enlarged half portion of a socket connector for association with the structure of Figures 2 and 3.

Figure 5 is a wiring diagram of the electric circuits of the novel brewer.

Figure 6:
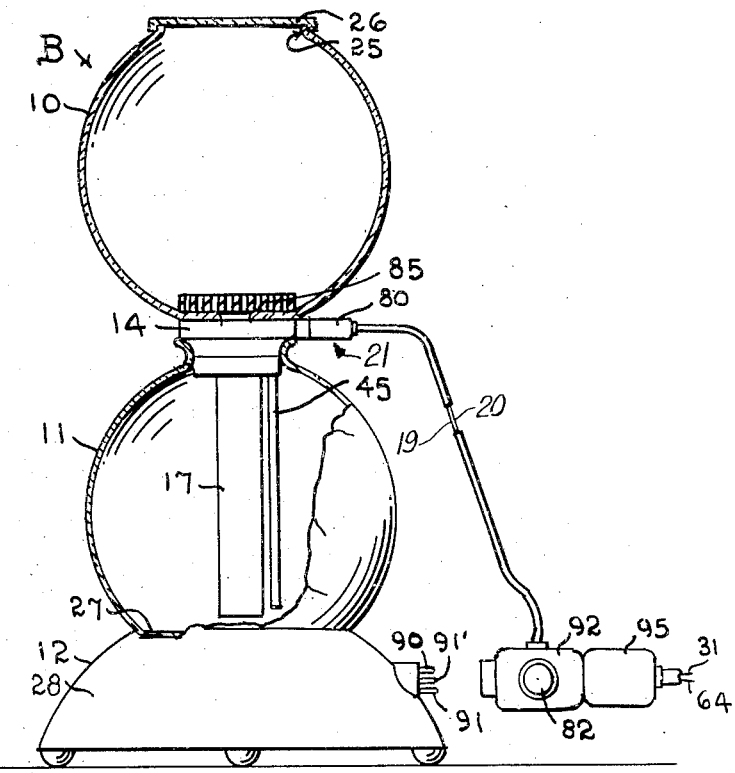
Figure 6 is a view mostly in vertical section similar to Figure 1, but of a modified form of the invention.

In the drawings, wherein for the purpose of illustration is shown a preferred and a modified form of the invention and wherein similar reference characters designate corresponding parts throughout the several views, the letter A designates the preferred form of the novel beverage brewer and the letter B the modified form.

Each form A and B is of the vacuum type brewer and include a conventional upper reservoir 10, a lower reservoir 11, supporting the upper reservoir, a base 12 for the lower reservoir, and an electric heating unit or means 13 carried by the base 12, a gasket 14 of special shape surrounding a passageway between the upper and lower reservoirs, a pair of electrodes 15 and 16 carried by the gasket 14, a conventional transfer tube 17 in the passageway, switch means 18 for the unit 13, a pair of flexible conductors 19 and 20 electrically connected with the unit 13 and switch means 18, and a quick-detachable electric plug-and-socket means 21 carried by the gasket 14 and conductors 19 and 20.

The upper reservoir 10 may be globe-shaped, have glass walls and be provided with an open mouth or upper end 25, covered by a suitable removable closure 26.

Supporting this reservoir 10 is the lower reservoir 11 which is, preferably, of glass, may be globe-shaped and have a bottom wall 27 which may rest upon the upper end of the hollow base 12, which has an outer wall 28.

The electric heating unit 13 carried within the base 12 may be a suitable number of resistances as, in the example shown in Figure 5 a high heat resistance 29 and a low heat resistance 30. One conductor 31 extends from the service current to one end of each resistance, and projects through the outer wall 28 of the base 12.

Extending from the lower end of the upper reservoir 10 is the transfer tube 17, which may be integral with the upper reservoir, to adjacent the bottom wall 27 of the lower reservoir 11. The tube 17 is, of course, open at its upper and lower end. Thus there is a passageway 32 between the two reservoirs. Surrounding the tube 17 is a gasket or open-centered plug-like body 14 of special shape shown more particularly in Figures 2–3 and it is, preferably, of dielectric material and includes an upper substantially cylindrical portion 35 having a central opening or bore 36 for the tube 17 and a shoulder 37 resting upon the upper end of the lower reservoir 11, and a smaller, preferably tapering lower portion 39 which extends a slight distance into the reservoir 11 and has a continuation of the central opening or bore 36. The upper portion 35 has a substantially horizontally-disposed offset 40.

Carried by the gasket 17 are the pair of electrodes 15 and 16 which depend therefrom and extend downwardly to closely adjacent the bottom wall 27 of the lower reservoir. These extend through the gasket portions 35 and 39 and into the offset 40 where they may be electrically connected with the plug and socket means 21. In part, the means 21 may be a pair of conventional pin plugs 43 and 44 which project from the extremity of the offset 40.

Surrounding the exposed portions of the electrodes 15 and 16 is a small-diametrical open-ended tube 45 which may be of glass, depending from the gasket 17. Preferably the latter is socketed with the upper end 46 of the tube 45 extending into this socket in a frictional fit with the wall of the socket.

Suitable means may be provided, interiorly of the tube 45 to retain the electrodes spaced apart. Such means may comprise a spider or spacer 47 of dielectric material frictionally engaging the spaced-apart electrodes and face of the tube 45.

Extending from the base 12 are the pair of flexible conductors 19 and 20 which terminate at their upper ends in a socketed connector 80 having a pair of sockets for the pin plugs 43 and 44.

The plug-and-socket connection is necessary so that the several parts of the brewer may be disassembled for cleaning etc.

In the preferred embodiment of the invention, the switch means 18 is housed within the base 12 and diagrammatically shown in Figure 5. This means includes a conventional two-radii unidirectional switch having a movable switch arm or wiper blade 60 pivoted intermediate its ends (nearer one end 61 than the other end 62). The end 61 is adapted to engage an arcuate fixed contact 63 electrically connected with a conductor 64 extending to the source of electric current. The other end 62 is adapted to engage a fixed contact 65 and, due to its arcuate shape, when the arm 60 is further rotated an adjacent arcuate fixed contact 66, as well as contact 65. Further rotation of the arm 60 breaks the connection with fixed contact 65 but continues connection with contact 66. Any conventional means may be employed to permit only unidirectional movement of the arm 60 (as in the direction of the arrow) so that further rotation of the arm 60 will break the connection at fixed contact 66 and still further rotation will again close circuit through contact 65 for another sequence.

From fixed contact 65 a conductor 67 extends to relay 68 which actuates a relay armature 69 against the action of a retraction core spring 70 to engage a relay contact 71 connected by the conductor 67 with fixed contact 65.

Relay 68 is in parallel with resistance 29, since contact 71 is also electrically connected, by conductor 72, with one end of resistance 29.

From fixed contact 66 a lead 73 extends to armature 69. Armature 69 normally engages (due to the force of the retraction spring 70) an armature contact 74 which is electrically connected with one end of the resistance 30, by conductor 75.

A pilot lamp 76 is electrically connected, as by leads 77 and 78, with conductors 31 and 73.

From the conductor 31 a lead 44 extends to one of the conventional terminals of the socket 80 of the plug and socket means 21, while from the coil of the relay 68 extends a lead 43 to the other terminal of the socket 80. An exterior switch button 82 may be provided to manipulate the arm 60.

Before describing the flow of electric current it should be stated that, in filling or charging the brewer, the material to be brewed and the liquid are introduced exactly as in conventional brewers. That is, the liquid occupies the lower reservoir 11 at the start of the brewing operation, and the material to be brewed occupies the upper reservoir 10 resting upon a suitable foraminous support 85. The liquid level may be initially, at the dot and dash lines 86 in Figure 1. Consequently a portion of the electrodes 15 and 16 will be immersed in the liquid.

Thus, there is provided an electrolytic switch, comprising the electrodes 15 and 16 and electrolyte (liquid introduced into reservoir 11).

From the foregoing, it will be seen that, upon rotation of the wiper or arm 60 clockwise from the position in Figure 5, the contact 62 will momentary engage contact 65 and close circuit through conductor 64 contact 63 switch arm 60, contacts 62 and 65 conductor 67, energize relay 68 and cause armature 69 to engage contact 71, so that if electrodes 15 and 16 are immersed in the liquid, current will flow through conductor 72 to resistance 29 and through conductor 31.

Upon a slight further clockwise rotation of wiper 60, its contact 62 will still engage fixed contact 65 but will also engage fixed contact 66, so that current will flow simultaneously through both contacts for an instant and then the circuit through fixed contact 65 will be broken there. Relay 68 then receives current through contact 71 (since the circuit through the relay was maintained during this simultaneous contact period and armature 69 remained attracted) so that the armature will remain in its position so long as the electrolyte surrounds electrodes 15 and 16.

Through armature 69 and contact 71, current is conducted to the resistance 29 so that the liquid above is heated rapidly and the vapor pressure in the reservoir 11 is raised also rapidly. When most of the liquid rises from reservoir 11, through the transfer tube 17 to the upper reservoir 10 so that the liquid level drops from 86 to 87, the electrodes 15 and 16 are no longer immersed, and the circuit is broken insofar as the electrolytic switch is concerned. The relay armature 69 urged by spring 70, moves away from contact 71 and closes circuit through contact 74 and conductor 75 to the low-heat resistance 30 which circuit remains closed until the switch 18 is actuated to break all contacts, as is apparent.

The cycle of operation as outlined is exact as to each successive brewing. Change in liquid levels occurs at the precise time interval when the conventional brewer would be manually placed at low heat in order to discontinue brewing but to maintain the beverage at a proper drinking temperature. But, with my novel brewer, the changes from high heat resistance to low heat resistance takes place automatically and at the proper time.

Figure 7:
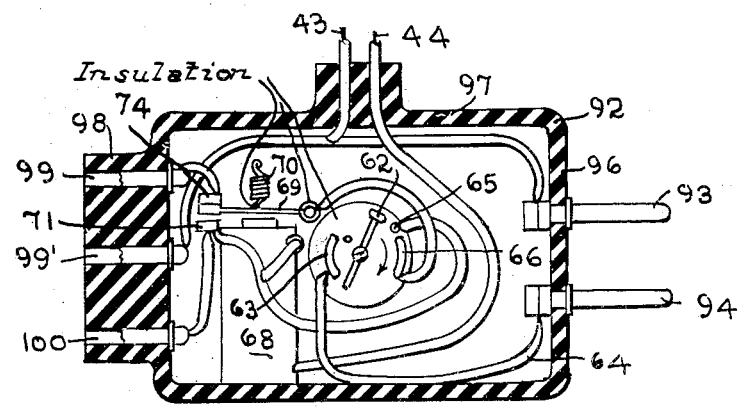
Figure 7 is an enlarged section through a switch housing, forming part of the modified structure.

In the modified or form B of the invention, shown in Figures 6 and 7, since much of the structure is the same as in form A, similar reference characters are employed in both forms. In the modified form, the switch means 18 of form B is not disposed within the base 12 but is carried exteriorly of the entire brewer. This form is applicable to a brewer structure where a pair of pins or prongs 90 and 91 project outwardly from the wall 28 of the base 12 and electrically connect with suitable resistances, such as 29 and 30, within the base, there being a common pin 91' electrically connected with both resistances.

A switch housing 92 is provided for the structure 18, with pin or prong terminals 93 and 94 project from one end 96 of the housing 92 to accommodate a plug 95 carrying the inner ends of the conductors 31 and 64. From this housing 92 conductors 43 and 44 project from one side 97.

At the opposite end 98 of the housing may be disposed three socket terminals 99, 99' and 100 for the pins 90, 91' and 91. Of course the conductors 43 and 44 connect with a plug 80.

In the case of the modified form B, the switch button 82 projects from the housing 92.

The tube 45 provides protection for the electrodes 15 and 16 but may be omitted. The gasket 14 functions as a gasket and also provides support for the electrodes, their surrounding tube and the pin terminals 43 and 44.

It is obvious that the electrodes 15 and 16 cannot be withdrawn from the reservoir 11 until the plug and socket connection 21 is broken.

Due to the manner in which the electric circuit is wired, the closing of the relay circuit occurs only once for each manual operation of the switch 18 to an "on" position, and subsequent return of the liquid to the lower reservoir 11 will not again actuate the relay (as the latter is in parallel with the resistance 29, as has been pointed out. The change in the liquid level in reservoir 11 functions as a switch in conjunction with the electrodes 15 and 16, for the relay circuit.

Various changes may be made to the form of the invention herein shown and described, without departing from the spirit of the invention or scope of the claims.

What is claimed is:

1. In a beverage brewer, an upper reservoir, a lower reservoir of dielectric material, a base for said lower reservoir, there being a passageway between said reservoirs, a gasket surrounding said passageway, a transfer tube extending downwardly from said upper reservoir through said gasket to adjacent the bottom of said lower reservoir, and an electric circuit, including an electric heating unit comprising a low heat resistance and a high heat resistance carried by said base, an electric switch having a pair of fixed contacts, a relay, including an armature, with said relay being electrically connected with one of said contacts and being in parallel with said high heat resistance, a lead from the other of said contacts to said armature, an armature contact, a lead from said armature contact to said low heat resistance, a pair of electrodes carried by said gasket and extending downwardly to adjacent the bottom of said lower reservoir, an electric conductor, electrically connected between said relay and one of said electrodes, and an electric conductor in circuit with said resistances and electrically connected with the other of said electrodes.

2. In a beverage brewer, an upper reservoir, a lower reservoir of dielectric material, a base for said lower reservoir, there being a passageway between said reservoirs, a gasket surrounding said passageway, a transfer tube extending downwardly from said upper reservoir through said gasket to adjacent the bottom of said lower reservoir, and an electric circuit, including an electric heating unit comprising a low heat resistance and a high heat resistance carried by said base, an electric switch having a pair of fixed contacts, a relay, including an armature, with said relay being electrically connected with one of said contacts and being in parallel with said high heat resistance, a lead from the other of said contacts to said armature, an armature contact, a lead from said armature contact to said low heat resistance, a pair of electrodes carried by said gasket and extending downwardly to adjacent the bottom of said lower reservoir, an electric conductor, electrically connected between said relay and one of said electrodes, and an electric conductor in circuit with said resistances and electrically connected with the other of said electrodes, said gasket being of dielectric material.

3. In a beverage brewer, an upper reservoir, a lower reservoir of dielectric material, a base for said lower reservoir, there being a passageway between said reservoirs, a gasket surrounding said passageway, a transfer tube extending downwardly from said upper reservoir through said gasket to adjacent the bottom of said lower reservoir, and an electric circuit including two electrical resistances, one of a higher electrical resistance than the other, carried by said base, an electric switch having a pair of fixed contacts, a relay, including an armature, with said relay being electrically connected with one of said contacts and being in parallel with one of said resistances, a lead from the other of said contacts to said armature, an armature contact, a lead from the armature contact to the other resistance, a pair of electrodes extending through said gasket and projecting downwardly to adjacent the bottom of said lower reservoir, an electric conductor, electrically connected between said relay and one of said electrodes, and an electric conductor in circuit with said resistances and electrically connected with the other of said electrodes.

4. In a beverage brewer, an upper reservoir, a lower reservoir of dielectric material, a base for said lower reservoir, there being a passageway between said reservoirs, a gasket surrounding said passageway, a transfer tube extending downwardly from said upper reservoir through said gasket to adjacent the bottom of said lower reservoir, and an electric circuit, including a dual resistance heating unit, including a first resistance and a second resistance, carried by said base, an electric switch having a pair of fixed contacts, a relay, including an armature, said relay being electrically connected with one of said contacts and being in parallel with one of the resistances, an armature contact, a lead from the other of said contacts to said armature, a lead from the armature contact to the other resistance, a pair of electrodes extending through said gasket and downwardly to adjacent the bottom of said lower reservoir, an electric conductor electrically connected between said relay and one of said electrodes, an electric conductor in circuit with said resistances and electrically connected with the other of said electrodes, and a quick-detachable plug-and-socket means interposed between said conductors and electrodes and carried jointly by said conductors and gasket.

5. In a beverage brewer, an upper reservoir, a lower reservoir of dielectric material, a base for said lower reservoir, there being a passageway between said reservoirs, a gasket surrounding said passageway, a transfer tube extending downwardly from said upper reservoir through said gasket to adjacent the bottom of said lower reservoir, and an electric circuit including a dual resistance heating unit, including a first resistance and a second resistance, carried by said base, an electric switch having a pair of fixed contacts, a relay, including an armature, said relay being electrically connected with one of said contacts and being in parallel with one of the resistances, an armature contact, a lead from the other of said contacts of said armature, a lead from the armature contact to the other resistance, a pair of electrodes extending through said gasket and downwardly to adjacent the bottom of said lower reservoir, an electric conductor electrically connected between said relay and one of said electrodes and normally extending upwardly from said base, exteriorly of said reservoirs, and normally extending toward said gasket, an electric conductor in circuit with said resistances and electrically connected with the other of said electrodes, and a quick-detachable plug- and-socket means interposed between said conductors and electrodes and carried jointly by said conductors and gasket.

PETER P. RUPPE.

REFERENCES CITED

The following references are of record in the file of this patent:

UNITED STATES PATENTS

| Number | Name | Date |
|---|---|---|
| 1,995,081 | Sommers | Mar. 19, 1935 |
| 2,150,801 | Keaton | Mar. 14, 1939 |
| 2,345,146 | Perlusz et al. | Mar. 28, 1944 |

FOREIGN PATENTS

| Number | Country | Date |
|---|---|---|
| 653,683 | Germany | Nov. 30, 1937 |